3,299,630
MULTIPLE GAS TURBINE ENGINE FUEL CONTROL
Stanley Alper, Springdale, Conn., assignor to General
Electric Company, a corporation of New York
Filed Mar. 20, 1964, Ser. No. 353,535
6 Claims. (Cl. 60—39.15)

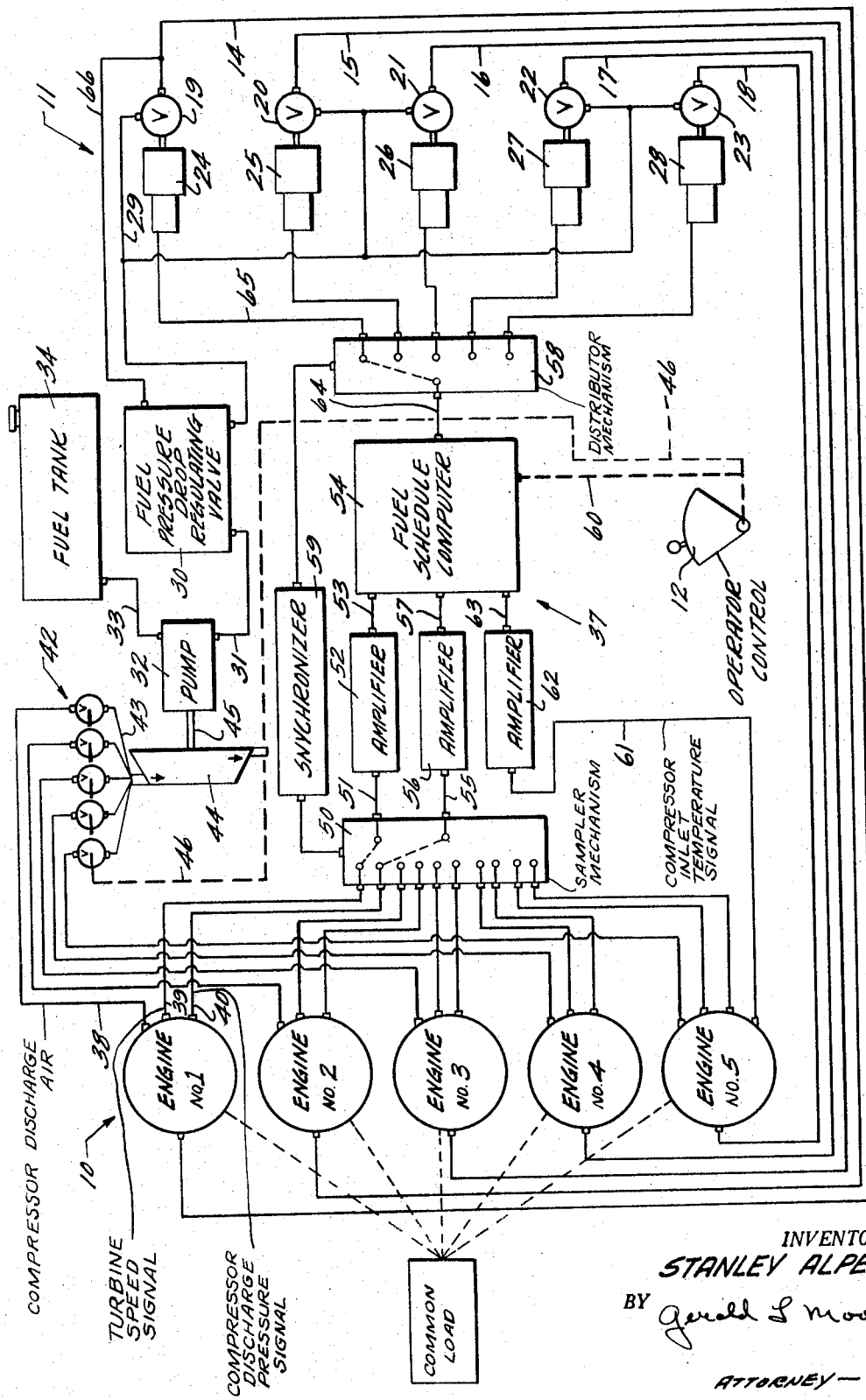

This invention relates to a control for multiple prime movers and more specifically, to a control for regulating a plurality of engines individually in response to operating parameters from each engine.

Where multiple engines are employed to drive a common load many problems are encountered in coordinating the engine controls, notably the fuel controls. Prior systems have been based on the provision of feedback signals which coordinate the operation of separate controls for each engine. Such systems are generally complex and hence not as reliable as would be desired.

The object of the invention is to provide simplified controls for multiple engines, particularly gas turbine engines, driving a common load and in so doing to provide improved reliability for such controls.

For illustrative purposes the invention is described with reference to a fuel control for a plurality of gas turbine engines having a compressor for increasing the energy level of a hot gas stream that is generated to provide a power output. Such controls regulate fuel flow as a function of a desired output, engine turbine speed, the compressor discharge pressure and the temperature of air entering the compressor. In the present instance a common computer is employed to generate fuel flow control signals for all of the engines of the power system. To this end a single demand signal is applied to a common computer. Likewise, a single compressor inlet temperature, derived from any engine, is applied to the computer since this parameter may be presumed to be the same for all engines. Sampler mechanism connects turbine speed and compressor discharge signals from a selected engine to the computer. A resultant fuel flow control signal is then applied by distributor mechanism to means for adjusting fuel flow to the selected engine to obtain a desired power output therefrom.

The sampler mechanism then applies the turbine speed and compressor discharge signals of a second engine to the common fuel flow computer. Simultaneously the distributor mechanism applies the computer output signal to means for controlling fuel flow to that engine. The sampler and distributor mechanisms sequentially connect the speed and pressure signals of each engine to the computer and then apply the computer output signal to the fuel flow adjusting or regulating means for that engine.

In a broader sense the invention comprises the use of a common control signal computer for a plurality of engines. A single demand signal input is provided to the signal generating means. Sampler mechanism sequentially applies to the computer a signal reflecting a given operating parameter of each engine in a multiple engine system. Simultaneously, a distributor mechanism connects the control signal to means for controlling the engine which is connected to the computer by the sampler mechanism.

Other objects and many of the attendant advantages of this invention will be readily appreciated as the same becomes better understood by reference to the following detailed description when considered in connection with the accompanying drawing wherein:

The drawing illustrates schematically the multiple engine control with the associated sampler circuits leading to the individual engines and means connecting the control to the engines for regulation of the individual engines to obtain the power output required of the engine system.

Referring to the drawing there is illustrated a multiple engine system comprising gas turbine engines Nos. 1 through 5 applied in a single power generating system having a common load. Such an installation may be one where all of the engines are utilized to drive a single rotor for electrical power generation or could be a multiple engine powered aircraft or other apparatus. In either instance it is necessary to regulate the fuel input and various engine control mechanisms for each individual engine, in this instance represented by the cluster of fuel valves generally indicated at 11 with one fuel valve associated with each engine. The fuel input is regulated in response to various engine operating parameters and the power output required as indicated by the positioning of the operator control 12. While the control is described as coordinating the fuel input to each engine, the same control could be applicable for regulating other engine control parameters in addition to or in place of this fuel control.

Turning first to the fuel system, fuel lines 14 through 18 lead to each individual engine with fuel valves 19 through 23 provided one for each engine including actuators 24 through 28 associated with each fuel valve respectively. Leading to each fuel valve is a line from the multiple branched fuel input line 29 passing through a fuel pressure drop regulating valve 30 from a pump 32 supplying fuel from a fuel tank 34. To regulate fuel input to the individual engines, for instance engine No. 1, the fuel passes from the fuel tank 34 through the fuel line 33 to the fuel pump 32, on through the fuel line 31 to the pressure drop regulating valve 30 and subsequently through the branched fuel line 29 to individual fuel valves (valve 19 for engine No. 1) for each engine which regulates the fuel input to that engine.

A control is generally indicated at 37, this control samples operating parameters from each engine and from these parameters and the power output desired from the system as indicated by the positioning of the operator control 12 regulates the individual fuel valves to obtain the desired total power output from the engine system. The control of engine No. 1 will be explained as representative of the similar control of each individual engine of the power system. Connected to engine No. 1 are three lines 38, 39 and 40 which carry the operating parameter signals necessary for proper regulation of the fuel input to that engine.

Line 38 to engine No. 1 transmits engine compressor discharge pressure through a multiple port valve 42 to an air turbine 44 which derives the pump 32 through a shaft connection 45. By the dotted line 46 representing a control input from the operator control 12 the valve 42 is regulated to vary the operation of pump 32 in accordance with the power output desired.

Line 39 connects a suitable speed sensor means (not shown) on the engine 1 to the sampler mechanism 50 from which a signal is selectively transmitted through line 51 to an amplifier 52 and line 53 to a fuel schedule computer 54. Similarly, line 40 leads from a compressor discharge pressure sensor (not shown) in engine No. 1 to the sampler mechanism 50. The signal from line 40 is selectively transmitted by line 55 to an amplifier 56 and to the fuel schedule computer 54 through line 57. While not numbered, lines are provided for each engine connecting similar signal means for that engine to the sampler mechanism 50.

Turning now to the operation of the control, the power output from the power system is responsive to the positioning of the operator control 12 while the regulation of the fuel input to each engine is responsive to both the power output required of the system and the operating parameters for each individual engine. To accomplish this the sampler mechanism will consecutively switch to each engine signal circuits to sample control parameters of each individual engine and provide inputs to the computer 54. Concurrent with the switching of the sampler mechanism a distributor mechanism 58 is switched to transmit a fuel input signal to the same engine with the switching of the two mechanisms being synchronized by means of the synchronizer 59. The sampler and distributor mechanisms function as switching means, as indicated, and may take, for example, the form of a conventional rotary, stepping relay wherein the shaft of such a relay would provide the synchronizing means.

Therefore taking engine No. 1 as an example, after the operator has set the control 12 to indicate the power output desired from the engine system providing a demand signal through line 60 to the fuel schedule computer 54. The compressor discharge pressure signal is fed through line 39 to the sampler mechanism and through the amplifier 52 to the fuel schedule computer 54, simultaneously the speed signal of engine No. 1 is fed through line 49 to the sampler mechanism 50 and through the amplifier 56 to the fuel schedule computer 54. Also a compressor inlet temperature signal is transmitted through line 61, from engine No. 5, amplifier 62 and line 63 to the fuel schedule computer, only one engine signal is utilized since this control parameter is the same for all engines. The fuel schedule computer, which may be of known design, combines the compressor discharge pressure signal, the speed signal of engine No. 1, the compressor inlet temperature signal and the demand signal from line 60 to compute a fuel input required for engine No. 1. This fuel input or control signal is then transmitted through the line 64 to the distributor mechanism 58 and through line 65 to the fuel valve actuator 24 which actuates fuel valve 19 to obtain the desired fuel input to engine No. 1.

The sampler and distributor mechanisms are then switched so that the compressor discharge pressure and speed signals of engine No. 2 are fed to the computer 54 and the resultant control signal is applied to actuator 25 and valve 20. In this manner one control 37 is utilzed wherein parameters from the individual engines are consecutively sensed and fed, by the sampler mechanism, through the fuel schedule computer for computation of the fuel input necessary to each engine. The computer control signal is then fed through the distributor mechanism to regulate the actuation of the fuel valve leading to that engine for proper fuel input to that engine.

The fuel regulating system has further control inputs in the form of compressor discharge pressure conducted from valve 42 through line 43 to drive the air turbine. Preferably the valve 42 which regulates the pump turbine air flow is a multiple ported valve so that exchange of pressures from one engine to the other is not effected. However, pump load sharing by each engine is assured by this porting arrangement with the further advantage of preventing pneumatic coupling between the indivdual engines. Further, there is added line 66 leading from the fuel line 14 supplying engine No. 1 transmits back to the fuel pressure drop regulating valve 30 a reference pressure corresponding to the fuel pressure after passage through the fuel valve. In the example, only one reference pressure feed back line 66 is provided since in this embodiment the pressure drop across all the valves is essentially the same, however, individual reference pressure lines could be provided.

While only the control circuit to engine No. 1 is explained in detail it is obvious that the control circuits to the other individual engines is identical to that of engine No. 1 and this description applies for each engine. This control may be utilized to regulate any number of engines in an engine assembly with the number being limited only by the complexity of the sampler and distributor mechanisms which must be provided. While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention. For instance, while a particular control utilzing specific parameters has been explained, naturally other control parameters could be sensed for controls utilizing such other control parameter inputs. Also while a gas turbine power system has been illustrated and described, other types of power systems could be regulated by this control with equally beneficial results.

What is claimed as new and desired to be secured by Letters Patent of the United States is:

1. A multiple engine control comprisng,
    sampling means for deriving an operating parameter signal from each engine and sequentially providing each parametric signal as an output therefrom,
    a computer, connected to the output of said sampling means, for generating a control signal as a function of each parametric signal thereto,
    means for controlling operation of each engine as a function of its control signal when applied thereto, and
    distributing means for sequentially applying the control signal generated by said computer as a function of a parametric signal of each given engine to the means controlling operation of that engine.

2. A multiple engine control as in claim 1 wherein,
    the sampling and distributing means comprise synchronously operated switching means.

3. A multiple engine control as in claim 1 wherein,
    means are provided for supplying a demand signal input to the computer and the computer is adapted to generate control signals as a function of both the demand signal and the parametric signals sequentially applied thereto.

4. A multiple engine control as in claim 1 wherein the means for controlling operation of each engine comprise means for regulating flow of fuel to each individual engine.

5. A multiple engine control as in claim 4 wherein,
    the engines are gas turbine engines having compressors for increasing the energy level of the gas streams generated thereby,
    the sampling means comprises means for deriving a second operating parameter signal and sequentially providing both parametric signals as an output therefrom, and
    means are provided for supplying a demand signal input to said computer and the computer is adapted to generate control signals as a function of both the demand signal and the first and second parametric signals sequentially applied thereto.

6. A multiple engine control as in claim 5 wherein,
    means provide an input signal to said computer from a single engine, this single input signal reflecting an operating parameter value common to all engines, and
    said computer generates control signals which are a function of said single input signal.

References Cited by the Examiner
UNITED STATES PATENTS 3,159,000  12/1964  McCombs _____ 60—39.15
3,174,284  3/1965  McCarthy _____ 60—39.15 X

FOREIGN PATENTS 855,573  12/1960  Great Britain.

JULIUS E. WEST, *Primary Examiner.*